United States Patent [15] 3,693,113
Glasser et al. [45] Sept. 19, 1972

[54] SERRASOID PHASE MODULATOR

[72] Inventors: James R. Glasser, R.R. 4, Box 173A, c/o Crusoe Ranch, Cheboygan, Mich. 49721; Stanley J. Tomsa, 1130 Ontario St., Oak Park, Ill. 60302

[22] Filed: Sept. 10, 1970

[21] Appl. No.: 71,174

Related U.S. Application Data

[63] Continuation-in-part of Ser. No. 805,711, March 10, 1969, abandoned.

[52] U.S. Cl.......................332/9 R, 325/142, 328/58, 328/111, 332/9 T

[51] Int. Cl.............................H03k 7/00, H03k 5/20

[58] Field of Search..325/142; 328/58, 111; 332/9 R, 332/9 T

[56] References Cited

UNITED STATES PATENTS 3,327,063 6/1967 Remley..................325/142 X

OTHER PUBLICATIONS

J. R. Day – " Serrasoid F–M Modulator" –Electronics October 1948, pp. 72– 76

*Primary Examiner*—Roy Lake
*Assistant Examiner*—Lawrence J. Dahl
*Attorney*—Mueller and Aichele

[57] ABSTRACT

The desired output from a serrasoid phase modulator, a narrow variable position pulse, is obtained from a variable width pulse by means of a differential amplifier. The high frequency components of the variable width pulse are both pre-emphasized and de-emphasized with the pre-emphasized pulse being coupled to one input of the differential amplifier and the de-emphasized pulse being coupled to the other input of differential amplifier. By varying the bias on the differ-ential amplifier a pulse as narrow as desired can be obtained without loss of pulse amplitude.

10 Claims, 5 Drawing Figures

Inventors
JAMES R. GLASSER
STANLEY J. TOMSA
BY
Mueller & Aichele
ATTYS.

Inventors
JAMES R. GLASSER
STANLEY J. TOMSA
BY Mueller, Aichele & Rauner
ATTYS.

SERRASOID PHASE MODULATOR

CROSS REFERENCE TO RELATED APPLICATION

This application is a continuation-in-part of application Ser. No. 805,711 filed Mar. 10, 1969 now abandoned.

BACKGROUND OF THE INVENTION

The serrasoid phase modulator is particularly well adapted to use in modern radio equipment since the circuitry involved can be readily formed as an integrated circuit. Previously designed serrasoid modulators, however, have had a low output and further have not been readily adapted to high RF frequencies since the attempts to make narrow output pulses having high frequency components has further reduced the already low output. In addition the previous circuits have resulted in a great deal of complexity because of the temperature and other compensations required.

SUMMARY OF THE INVENTION

It is, therefore, an object of this invention to provide an improved form of a serrasoid phase modulator.

Another object of this invention is to provide a serrasoid phase modulator operable at high RF frequencies.

Another object of this invention is to provide a serrasoid phase modulator having output pulses of a high magnitude.

In practicing this invention a serrasoid phase modulator is provided including a ramp generator which develops linear ramp signals in response to RF pulses applied thereto. The ramp signals are compared in a comparator with the audio input signal and when the ramp signal reaches a particular magnitude in relation to the audio input signal the comparator shifts states to produce the leading edge of the pulse signal. The comparator, after a predetermined period of time, shifts back to its normal state to produce the trailing edge of the pulse signal. Thus the position of the leading edge of the pulse varies according to the audio input signal.

The variable width pulse thus generated is coupled to a pre-emphasis circuit which emphasizes the high frequency components of the variable width pulse and also to a de-emphasis circuit which attenuates the high frequency components of the variable width pulse. The outputs of the pre-emphasis and de-emphasis networks are coupled to a differential amplifier which compares the two signals to develop a narrow pulse output according to the relationship between the magnitudes of the de-emphasized and pre-emphasized pulses. By proper setting of bias voltages on the differential amplifier the width of the pulse can be adjusted. The differential amplifier is biased so that the narrow output pulse starts with the leading edge of the variable width pulse so that the narrow output pulse varies in position according to the modulation voltage applied to the comparator.

Instead of generating a variable position narrow pulse the differential amplifier can also be designed to develop a variable position ramp signal. The second serrasoid modulator is then coupled to the first serrasoid modulator to provide an increased phase change with modulation. This is particularly desirable for low RF frequency systems where the phase changes in the output of the serrasoid modulator are not multiplied by as high a multiplier as in transmitters developing high RF frequencies.

The invention is illustrated in the drawings of which:

DESCRIPTION OF THE INVENTION

Figure 1:
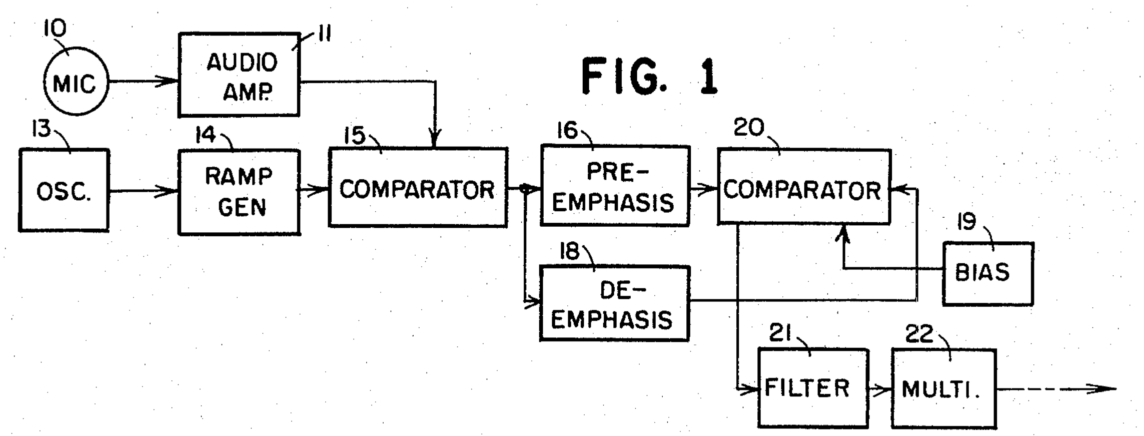
FIG. 1 is a block diagram of a serrasoid phase modulator incorporating the features of this invention.

Referring to FIG. 1 there is shown a block diagram of a serrasoid modulator incorporating the features of this invention. A microphone 10 produces an audio signal which is amplified in audio amplifier 11 and coupled to one input of comparator 15. Oscillator 13 produces RF pulses which are coupled to a ramp generator 14. Ramp generator 14 acts to develop ramp signals in response to the pulses applied thereto and the ramp signals are coupled to the other input of comparator 15. The ramp signals start at an initial potential and rise relatively slowly to a maximum potential. When the maximum potential is reached the ramp signal quickly drops to its initial potential.

Comparator 15 compares the audio signal and the ramp signal and develops an output signal in accordance with the relative magnitude of the two input signals. When the ramp signal is less than the audio signal the comparator is in a first state and the output potential is at, for example, a low value. When the ramp signal rises above the audio signal the comparator shifts to a second state and the amplitude output of the signal from the comparator rises to a higher potential. Thus the output of the comparator 15 is a pulse signal train. Since the audio signals are relatively low frequency signals and the ramp signals are high frequency signals, the audio signal does not change appreciably during several ramp signals. However, over a relatively long period of time the audio signal will change and, therefore, the leading edge of the pulses in the pulse train change position relative to the trailing edge. Thus the output pulse train from comparator 15 consists of variable width pulses.

Figure 2:
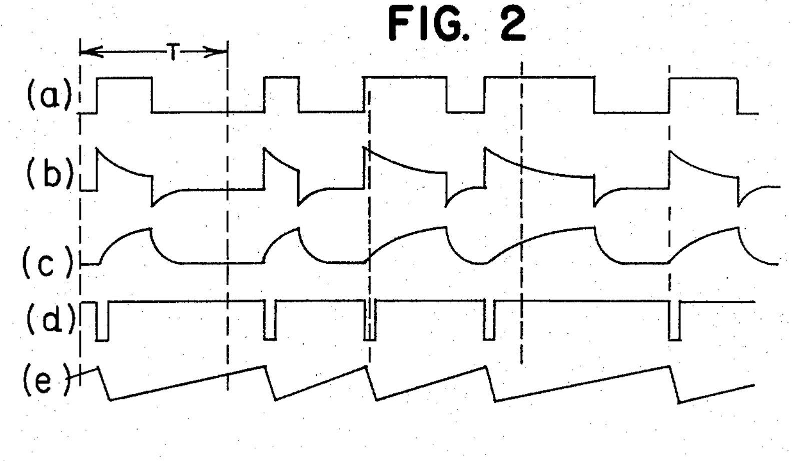
FIG. 2 is a set of curves illustrating the operation of the system of FIG. 1.

In FIG. 2*a* there is shown the variable width pulse train of comparator 15. It can be seen that the trailing edge of the pulses always occur at the same time relative to the fixed period of the pulse. However, the leading edge of the pulse changes in response to the modulation from audio amplifier 11.

The variable width pulses of the pulse train are converted to pulses whose positions change so that the output signal from the modulator is phase modulated. This has been achieved by differentiating the square wave output of the comparator and amplifying the differentiated pulses that correspond to the moving edge while clipping off the undesired pulses corresponding to the stationary trailing edge. This is difficult to do since the output of an R-C type differentiator is limited if a narrow pulse is desired. The output of such a differentiator is not well suited to driving a transistor amplifier since the base-emitter junction drop of the transistor must be overcome. In addition the output must be a low impedance if the fast rise and fall times of the amplifier are to be maintained. This requirement necessitates a large coupling capacitor which cannot be readily integrated. Even if these conditions are met the pulse amplitude is still dependent on the amplitude and rise time of the input waveform which may change when modulation is applied. This causes undesired amplitude modulation of the output pulse.

To overcome these problems the pulse generation circuit of this invention was developed. The circuit includes preemphasis circuit 16 and a de-emphasis circuit 18 both coupled to comparator 15. Pre-emphasis circuit 16 acts to pre-emphasize or increase the magnitude of the high frequency components or leading edges of the variable width pulses with respect to the trailing edges thereof and the output of this circuit is applied to one input of comparator 20. The wave shape of the pre-emphasized variable width pulse is shown in FIG. 2*b*. The output of the de-emphasis circuit 18 is shown in FIG. 2*c* and the circuit 18 acts to de-emphasize or attentuate the high frequency components or leading edges of the variable width pulses with respect to the trailing edges thereof. The output of this circuit is applied to another input of comparator 20. A DC bias from bias circuit 19 is also applied to comparator 20 to establish the point at which comparator 20 changes state.

Over most of the cycle the voltage due to the sum of the DC bias plus the de-emphasized square wave exceeds the voltage due to the pre-emphasized square wave alone. Therefore, the differential amplifier is in one state over most of the cycle. When the square wave is passed through the pre-emphasis network an overshoot is introduced and leading edge of the square wave momentarily exceeds the voltage from the de-emphasis network and the DC bias potential. This causes the differential amplifier to temporarily change state and a pulse is generated as shown in FIG. 2*d*. The pulse width is determined by how long the pre-emphasized voltage exceeds the de-emphasized voltage plus the DC bias. Pulse width can be reduced by decreasing either the fall time of the pre-emphasis input or the rise time of the de-emphasis input. By making the rise time of the de-emphasized wave fast enough a very narrow input pulse is not necessary for the production of a narrow output pulse. The pulse width can also be changed by varying the DC bias. The magnitude of the output pulse is determined by the differential amplifier and not by the input pulses because of the current source in series with the emitters of the differential amplifier transistors.

The narrow output pulses from comparator 20 are applied to a filter 21 which removes all but one harmonic frequency. The output harmonic from filter 21 is then coupled to multiplier 22 where it can be further multiplied and amplified as required. The output of multiplier 22 is coupled to the remaining portions of the transmitter circuit for use thereby.

Figures 3, 5:
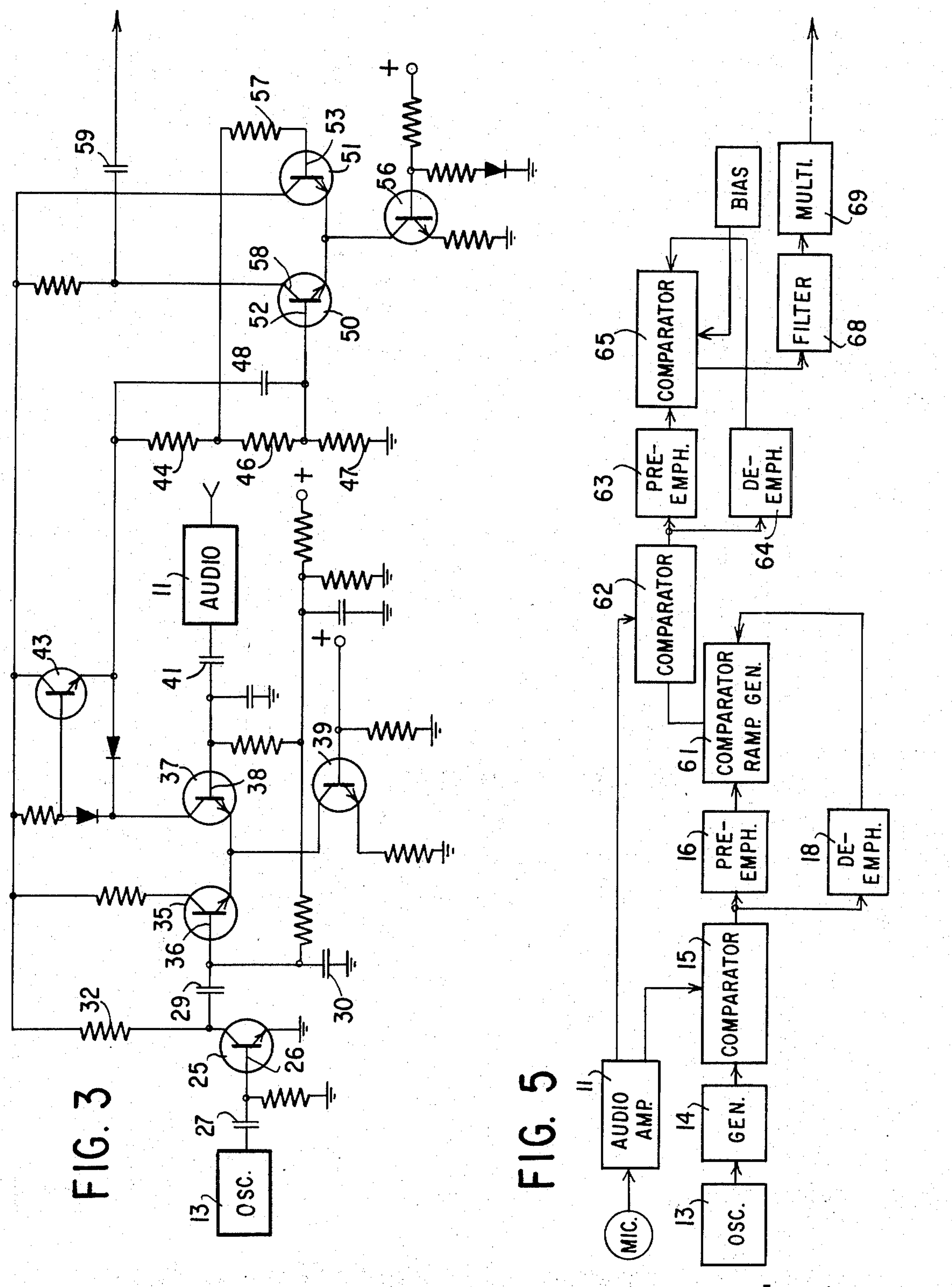
FIG. 3 is a partial schematic and partial block diagram of the serrasoid modulator of FIG. 1.
FIG. 5 is a block diagram of a combination of two serrasoid modulators to produce a greater phase shift.

Referring to FIG. 3 there is shown a partial block diagram and partial schematic of the serrasoid phase modulator of FIG. 1. Oscillator 13 may be a class C oscillator developing RF pulses. These pulses are coupled to the ramp generator consisting of transistor 25 biased to cutoff and an R-C charging circuit in the collector circuit consisting of resistor 32 and capacitors 29 and 30. The RF pulses from oscillator 13 are coupled to base 26 of transistor 25 through capacitor 27 and act to periodically bias transistor 25 to conduction.

With transistor 25 biased to nonconduction capacitors 29 and 30 charge through resistance 32. Each time an RF pulse from oscillator 13 biases transistor 25 into conduction capacitors 29 and 30 are shorted to ground discharging the capacitors. The resulting sawtooth voltage is applied to base 36 of transistor 35. The peak of the sawtooth pulse is made small with respect to the B+ potential applied to resistor 32 so that the sawtooth pulse is linear.

The differential amplifier consisting of transistors 35 and 37 acts as a comparator circuit. A common bias string feeds both transistors 35 and 37 to provide a direct current balance. The ramp signal is AC coupled so that the differential amplifier will change states midway up the ramp in response to the ramp signal only, as this corresponds to its average voltage. A current source transistor 39 is coupled in series with the emitters of transistors 35 and 37 to avoid saturation of the stage thus providing a constant amplitude output pulse.

The output of audio amplifier 11 is coupled to base 38 of transistor 37 through capacitor 41. While the DC bias is set so as to cause the amplifier to change states midway up the ramp with only the ramp signal present, the audio signal coupled to base 38 of transistor 37 changes the point at which the amplifier changes states and thus changes the leading edge of the output pulses from the differential amplifier. An emitter follower output transistor 43 provides a low output impedance. The output is a square wave whose duty cycle is proportional to the audio input.

A differential amplifier acting as a second comparator is formed by transistors 50 and 51. A current source transistor 56 is coupled in series with each of the emitters of transistors 50 and 51 to prevent saturation of the differential amplifier and to provide a constant amplitude output pulse. The output signal from the differential amplifier transistors 35 and 37 is coupled to base 52 of transistor 50 through the pre-emphasis network consisting of resistors 44 and 46 in parallel with capacitor 48 with the combination being in series with resistor 47. This circuits acts to attenuate the lows with respect to the high frequencies of the input pulses. The variable width pulse signal is coupled to base 53 of transistor 51 through resistors 44 and 57. Resistors 44 and 57 together with the input capacitance of transistor 51 act as a de-emphasis network for attenuating the high frequency portion of the variable width pulse signal. DC offset bias is provided by the voltage divider action of resistors 44, 46 and 47 which establish the point on the AC signal at which switching of the states of the differential amplifier occurs.

Normally the de-emphasized signal applied to transistor 51 biases this transistor to conduction and the potential output on collector 58 of transistor 50 is high. At the leading edge of the variable width pulses the pre-emphasized pulse exceeds the de-emphasized pulse so that transistor 50 is biased to conduction causing the potential on collector 58 to drop thus forming the narrow pulses of FIG. 2*d*. The narrow pulses formed on collector 58 are coupled to the desired circuits through capacitor 59.

The output of the serrasoid modulator is filtered to develop a phase shifted RF signal with the amount of phase shift dependent upon the modulating signal. The RF frequency is multiplied by selection of a desired harmonic, by a multiplier circuit or by a combination of both. As the RF signal is multiplied the amount of phase shift is also multiplied. Where a large amount of RF multiplication is required a single serrasoid modulator is sufficient. However, where the final RF frequency is relatively low, more than one serrasoid modulator connected in tandem may be required.

Figure 4:
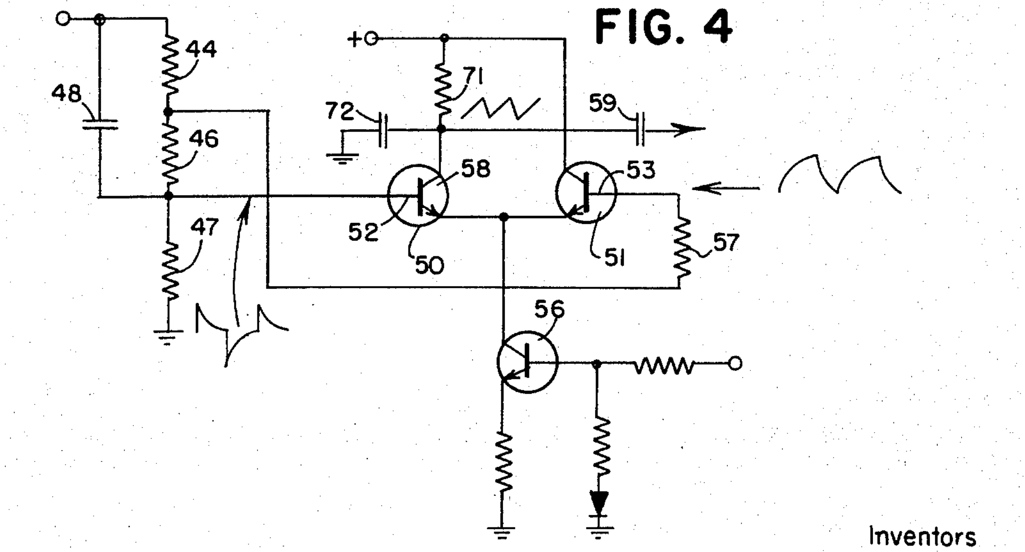
FIG. 4 is a schematic of a portion of the serrasoid modulator of FIG. 3.

In FIG. 5 there are shown two serrasoid modulators coupled in tandem to produce a greater phase shift than is possible with a single serrasoid phase modulator. Portions of the system which are identical to the system of FIG. 1 have the same reference numerals. Comparator 20 of FIG. 1 is replaced by a comparator ramp generator 61 in the system in FIG. 5. A schematic of the comparator ramp generator 61 is shown in FIG. 4. This comparator ramp generator is similar to the comparator shown in FIG. 3, and identical components have the same reference numerals. The comparator ramp generator 61 differs from the comparator 20 in that a capacitor 72 is coupled between collector 58 and a reference potential. When transistor 50 is biased to conduction as previously described, the potential on collector 58 drops rapidly. With transistor 50 biased to nonconduction capacitor 72 charges relatively slowly to form a sawtooth output wave shown in FIG. 2*e*. This sawtooth wave has a variable position since the triggering pulses for it occur at various times according to the modulating voltage applied from the audio stages.

Referring again to FIG. 5 the output variable position ramp signal from comparator ramp generator 61 is coupled to comparator 62 which is similar to comparator 15. The audio output of audio amplifier 11 is also coupled to comparator 62 which acts in the same manner as comparator 15 to produce a variable width pulse. The pre-emphasis network 63 and deemphasis network 64, comparator 65, filter 68 and multiplier 69 work in the same manner as pre-emphasis network 16, deemphasis network 18, comparator 20, filter 21 and multiplier 22 as previously described. By use of the two modulators in tandem the phase shift developed by the first modulator is added to the phase shift developed by the second modulator to increase the amount of phase shift developed by the serrasoid modulator.

We claim:

1. A serrasoid phase modulator, responsive to a modulation signal to develop a phase modulated carrier wave, including in combination:

signal processing means adapted to receive the modulation signal and being responsive thereto to develop a pulse train signal of variable width pulses at a first conductor, each of said variable width pulses having a first edge with a fixed time relationship with the first edges of the other of said pulses in said pulse train and a second edge, said second edges having a variable time relationship with the first edges of said pulses;

pre-emphasis means connected to said first conductor, said pre-emphasis means being responsive to said pulse train signal to pre-emphasize the high frequency components thereof to provide a pre-emphasized signal at a second conductor;

de-emphasis means connected to said first conductor and being responsive to said pulse train signal to de-emphasize the high frequency components thereof to provide a de-emphasized signal at a third conductor; and comparator means connected to said second and third conductors for comparing the relative magnitudes of said pre-emphasized and de-emphasized signals, to develop therefrom a train of variable position output pulses having first edges substantially coincident with said second edges of said variable width pulses and second edges occurring at times determined by said relative magnitude of said de-emphasized and pre-emphasized signals.

2. The serrasoid phase modulator of claim 1 wherein, said second edge of each of said variable width pulses in said pulse train signal is the leading edge and said first edge of each of said variable width pulses in said pulse train signal is the trailing edge.

3. The serrasoid phase modulator of claim 1 further including, filter means coupled to said comparator means, said filter means being responsive to said variable position output pulse to filter the same and thereby attenuate all but one harmonic of said variable position output pulses.

4. The serrasoid phase modulator of claim 3 further including, bias circuit means coupled to said comparator means, said bias circuit means acting to apply a bias potential to said comparator means for changing said relative magnitudes of said de-emphasized and pre-emphasized signals.

5. A serrasoid phase modulator responsive to a modulation signal to develop a phase modulator carrier wave, including in combination:

means for developing timed pulse signals;

ramp generator means coupled to said means for developing timed pulse signals and being responsive to said timed pulse signals to develop ramp signals having a period equal to the period of said timed pulse signals;

first comparator means coupled to said ramp generator means, said first comparator means being adapted to receive the modulation signal and to compare the amplitudes of the modulation signal and said ramp signal to develop a first pulse train signal of variable width pulses at a first conductor, said variable width pulses having leading edges occurring in response to the relative amplitude of the modulation signal and said ramp signal;

first pre-emphasis means coupled to said first conductor and being responsive to said first pulse train signal to pre-emphasize the high frequency components thereof to develop a first pre-emphasized signal whereby the leading edges of said pulses thereof have greater amplitudes than the trailing edges thereof;

first de-emphasis means coupled to said first conductor and being responsive to said first pulse train signal to de-emphasize the high frequency components thereof to develop a first de-emphasized signal whereby the leading edges of said pulses thereof have lower amplitudes than the trailing edges thereof;

second comparator means coupled to said first pre-emphasis means and to said first de-emphasis means and being responsive to said first pre-emphasized and first de-emphasized signals to develop a first output pulse signal having a first amplitude in response to the amplitude of said first preemphasized signal being greater than the amplitude of said first de-emphasized signal and a second amplitude in response to the amplitude of said first de-emphasized signal being greater than the amplitude of said first pre-emphasized signal, whereby said first output pulse signal has pulses with relative positions with respect to each other, said relative positions being dependent upon the modulation signal.

6. The serrasoid phase modulator of claim 5 wherein:

said second comparator means is a differential amplifier having a first state for developing said first amplitude of said first output pulse signal and a second state for developing said second amplitude of said first output pulse signal, said differential amplifier being responsive to said leading edge of said first pre-emphasized signal to be switched to said first state, said differential amplifier being responsive to a predetermined difference between the amplitudes of said first pre-emphasized and first de-emphasized signals to be switched to said second state; and bias circuit means coupled to said differential amplifier for applying a bias potential thereto whereby the relative amplitudes of said first pre-emphasized and said first de-emphasized signals are changed thereby changing the point at which said second differential amplifier is switched from said second state to said first state.

7. The serrasoid modulator of claim 5 wherein, said first pre-emphasis means and said first de-emphasis means each are formed by resistance-capacitance networks.

8. The serrasoid modulator of claim 5 wherein, said means for developing said timed pulse signals is a class C oscillator.

9. The serrasoid modulator of claim 5 further including:

capacitance means coupled to said second comparator means for integrating said output pulse signal therefrom to develop a variable position ramp signal;

third comparator means adapted to receive the modulation signal and coupled to said capacitance means, said third comparator means being responsive to the relative amplitudes of the modulation signal and said variable position ramp signal to develop a second pulse train signal of variable width pulses at a second conductor;

second pre-emphasis means coupled to said second conductor and being responsive to said second pulse train signal of variable width pulses to de-emphasize the high frequency components thereof to develop a second pre-emphasized signal;

second de-emphasis means coupled to said second conductor and being responsive to said second variable width pulse train signal to de-emphasize the high frequency components thereof to develop a second de-emphasized signal;

fourth comparator means coupled to said second pre-emphasis means and said second de-emphasis means and being responsive to said second pre-emphasized and said second de-emphasized signals to develop a second output pulse signal having a third amplitude in response to the magnitude of said second pre-emphasized signal being greater than the magnitude of said second de-emphasized signal and a fourth amplitude in response to the magnitude of said second de-emphasized signal being greater than the magnitude of said second pre-emphasized signal, whereby said second output pulse signal has pulses with relative positions with respect to each other dependent upon the modulation signal.

10. A serrasoid phase modulator which is responsive to a modulation signal to develop a modulated carrier wave, the modulator including in combination:

signal processing means adapted to receive the modulation signal and being responsive to said modulating signal to develop a pulse train of variable width pulses at an output terminal thereof, each of said variable width pulses being comprised of high and low frequency components and having first and second edges, said first edges having magnitudes controlled by the magnitudes of said low frequency components and having fixed time intervals therebetween, said second edges having magnitudes controlled by the magnitudes of said high frequency components, and having time intervals therebetween which vary with the modulating signal;

pre-emphasis means having an input terminal connected to said output terminal of said signal processing means and an output terminal, said pre-emphasis means increasing the magnitude of said high frequency components with respect to said magnitudes of said low frequency components to increase the magnitudes of said second edges of said variable width pulses with respect to the magnitudes of said first edges to provide a pre-emphasized signal at said output terminal thereof;

de-emphasis means having an input terminal connected to said output terminal of said signal processing means and an output terminal, said de-emphasis means decreasing the magnitudes of said low frequency components to decrease the magnitudes of said second edges with respect to said first edges to provide a de-emphasized signal at said output terminal thereof; and comparator means having a first input terminal coupled to said output terminal of said pre-emphasis means and a second input terminal coupled to said output terminal of said de-emphasis means and an output terminal, said comparator means responding when the instantaneous magnitudes of said preemphasized signals exceed the corresponding instantaneous magnitudes of said de-emphasized signals to develop a train of variable position output pulses at said output terminal thereof.

* * * * *